United States Patent

[11] 3,594,641

| [72] | Inventors | Harald Hoel<br>Vestby, Norway;<br>Bertil Noro, Alvsjo; Rolf Eriksson,<br>Huddinge, Sweden |
|---|---|---|
| [21] | Appl. No. | 872,112 |
| [22] | Filed | Oct. 29, 1969 |
| [45] | Patented | July 20, 1971 |
| [73] | Assignee | Telefonaktiebolaget LM Ericsson<br>Stockholm, Sweden |
| [32] | Priority | Nov. 8, 1969 |
| [33] | | Sweden |
| [31] | | 15171/68 |

[54] ARRANGEMENT FOR INDICATING BACK CURRENTS IN A DIODE MATRIX BUILT UP BY MEANS OF BISTABLE ELEMENTS IN THE CROSSING POINTS
2 Claims, 1 Drawing Fig.

[52] U.S. Cl. .................................................. 324/158 D,
324/73 R
[51] Int. Cl. .................................................. G01r 31/22,
G01r 15/12

[50] Field of Search .......................................... 324/158,
158 D, 73, 51

[56] References Cited
UNITED STATES PATENTS

| 2,895,106 | 7/1959 | Taunt .......................... | 324/158 |
| 3,168,697 | 2/1965 | Humphrey, Jr. .............. | 324/73 |

Primary Examiner—Rudolph V. Rolinec
Assistant Examiner—Ernest F. Karlsen
Attorney—Hane & Baxley

ABSTRACT: Arrangement for indicating back currents in a viz. matrix built up by means of bistable elements in the crossing points. In diodes of the type generally used in diode matrices normally a certain back current is existing. As long as the back current is low it will not disturb the function of the diode matrix, but if it should be too high it can occur that faulty crossing points are indicated. The arrangement makes it possible to indicate back currents in a diode matrix of a special type, viz. built up by means of a bistable element and two diodes in each crossing point.

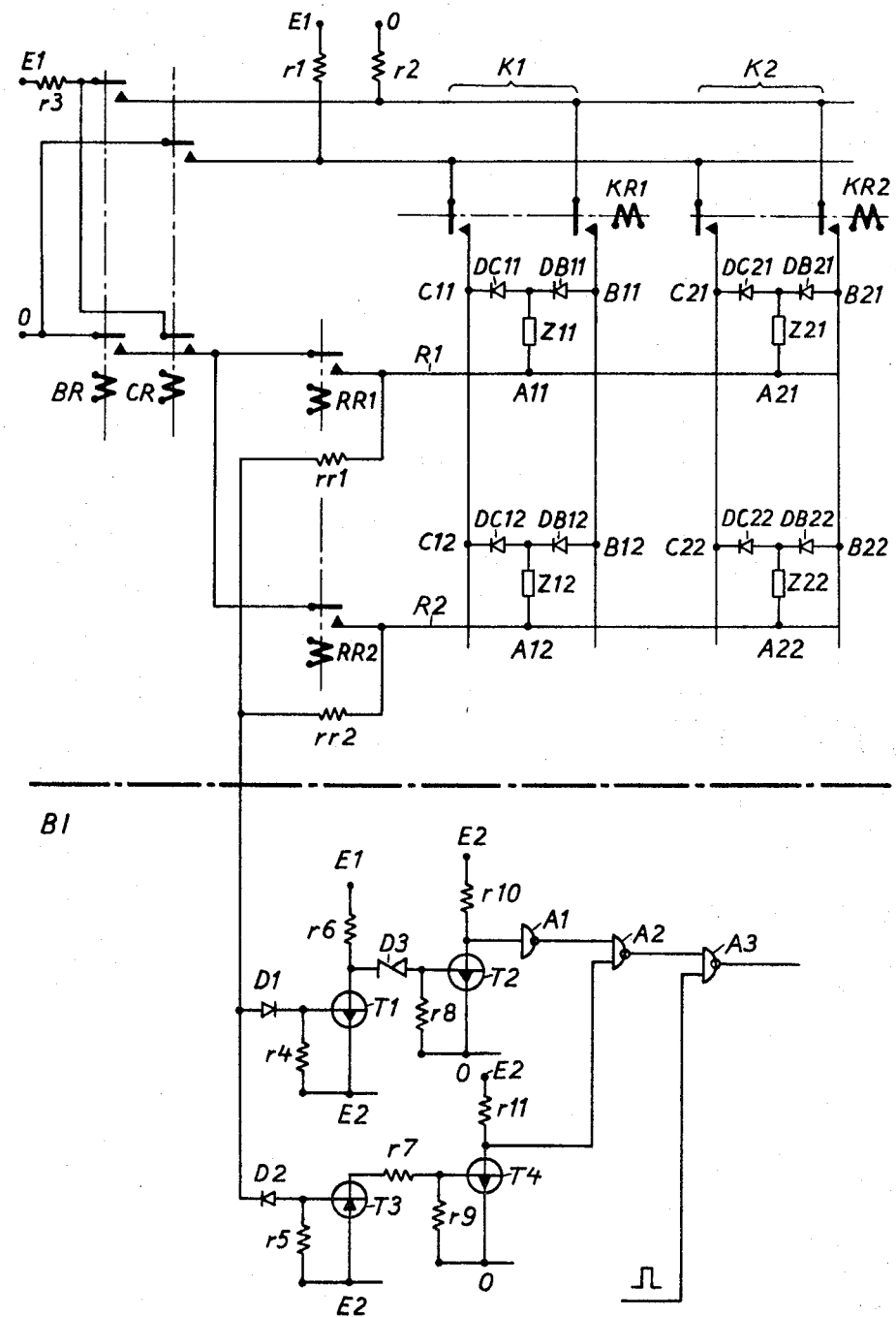

ARRANGEMENT FOR INDICATING BACK CURRENTS IN A DIODE MATRIX BUILT UP BY MEANS OF BISTABLE ELEMENTS IN THE CROSSING POINTS

The present invention refers to an arrangement for indicating back currents in a diode matrix the coordinate conductors of which are interconnected electrically in the crossing points by means of a load in the form of a bistable element, connected in series with a diode for each current direction.

In diodes of the type generally used in diode matrices, normally a certain back current is existing. This does not disturb the function of the diode matrix as long as the back current is kept below a certain level. If, however, the back current should be too high, disturbances can appear in the function of the diode matrix, when faulty crossing points can be indicated.

It is earlier known to use relays as load in the crossing points of a diode matrix, in order to control secondary electric circuits. In monostable relays only one diode in every crossing point is required but if bistable relays are used, each relay has to be connected in series with a diode for each of the current directions. An arrangement for indicating back currents in a diode matrix having two diodes in each crossing point is not prior art.

The purpose of the invention is to provide an arrangement for indicating back currents arising because of faulty diodes in a diode matrix built up by means of bistable elements in the crossing points. This is achieved by the invention in accordance with the characterizing part of the patent claim.

The invention will be described more in detail by way of an embodiment with reference to the accompanying drawing which shows diagrammatically the arrangement applied to four crossing points.

The crossing point between the coordinate conductors corresponding to column No. 1, row No. 1 is designated by A11, B11, C11. In a similar way the crossing point between the coordinate conductors corresponding to column No. 1, row No. 2 for example, is designated by A12, B12, C12, and analogously for the other crossing points. Z11 indicates a load which for example can be a polarized relay and which is connected a series with a diode DB11 for one current direction and with a diode DC11 for the opposite direction, in the crossing point A11, B11, C11. Similarly Z12 indicates a load in the crossing point A12, B12, C12, connected in series with the diodes DB12 and DC12 respectively and analogously for the other crossing points. KR1 indicates a relay which in activated condition connects the crossing points in column No. 1. Analogously KR2 controls the connection of the crossing points in column No. 2. A relay that controls the connection of the crossing points in row No. 1 is indicated by RR1, and RR2 indicates a relay that controls the crossing points in row No. 2. By BR is indicated a relay which in operative condition, when a column relay and row relay are operated simultaneously, produces a current in the leading direction of the DB-diodes while CR indicates a relay which in a similar way produces a current through the leading direction of the DC-diodes.

A back current indicating arrangement BI includes four transistors T1, T2, T3 and T4, and inverting circuit A1, inverting AND-circuits or NAND-circuits A2 and A3, diodes D1 and D2 which may be of the same type as the matrix diodes, a zener diode D3, and furthermore a number of resistances as it appears from the FIGURE.

Voltages connected to the arrangement are referenced E1 and E2. Of said voltages E1 should be greater than E2, for example +24 v. and +5 v. respectively while 0 indicates zero potential.

The arrangement functions in such a way that when a crossing point is to be selected, a test of the diodes of the corresponding column will first be carried out and then the bistable element of the crossing point is supplied with current provided that the diodes have turned out to be correct. In the contrary case, said current supply can, if required, be inhibited. If for example the crossing point A12, B12, C12 between column No. 1 and row No. 2 is to be selected, the test moment is started in such a way that only the column relay KR1 is operated, the voltage E1 being connected to the points C11, C12...... and 0-potential being connected to the points B11, B12...... If all the diodes in column No. 1 are correct, no current will pass through these, as is seen from the FIGURE, i.e. the fault indicating means remains unaffected. Then the desired crossing point will be selected—in the embodiment chosen, consequently A12, B12, C12—by operating the row relay and one of the relays BR or CR. Upon operation of BR a current passes from E1 through the resistance $r3$, a make contact of BR, a make contact of KR1, the diode DB12, the load Z12, the make contact of RR2, a make contact of BR to O. Upon operation of the relay CR current passes from E1 via the resistance $r3$, a make contact of CR, the make contact of RR2, the load Z12, the diode DC12, a make contact of KR1, a make contact of CR to 0.

If, however, a diode fault appears and it is for example the diode DC11 that has a too high back current, the following takes place: Upon operation of the relay KR1 a current passes from E1 through the resistance $r1$, a make contact of KR1, the diode DC11 in the backward direction, the load Z11, the resistance $rr1$, the diode D1, the resistance $r4$ in parallel connection with the base-emitter of the transistor T1, to E2. The transistor T1 becomes conducting and throttles the transistor T2. In that way the input voltage of the inverting circuit A1 becomes high, the output voltage low. When the transistor T4 is nonconducting, the input voltages of the inputs of the NAND-circuit A2 will be low and high respectively, i.e. the output voltage becomes high. The input voltage of the one input of the NAND-circuit A3 thus becomes high; the other input is kept normally at 0-potential but is controlled at a suitable moment before current is fed through the crossing point selected, by means of a positive current pulse. When no diode faults appear in the matrix, the output of the NAND-circuit A3 has a high potential. The same is the case when a fault is found as long as no control pulse appears. When such a pulse is supplied to the other input of the NAND-circuit A3 and a diode fault exists, the output voltage from A3 will be low and this is consequently an indication that some diode in the matrix is faulty and more exactly within the column selected. The output voltage from A3 can also be used to inhibit the current supply to a crossing point.

If, instead, it is for example the diode DB12 that has a too high leak current, the following will take place: Upon operation of the relay KR1, a current passes from E2 over the resistance $r5$ parallelly to the base-emitter of the transistor T3, the diode D2, the resistance $rr2$, the load Z12, the diode DB12 in the backward direction, a make contact of the relay KR1, the resistance $r2$ to 0. In this way the transistor T3 becomes conducting and in consequence of that also the transistor T4 will be conducting. As the transistor T1 now is blocked, the transistor T2 is conducting, which implies that also in this case the one input voltage of the NAND-circuit A2 becomes high, the other low but in reverse order to what has been described earlier. In the same way as earlier, the NAND-circuit A3 is activated in such a way that when supplying a positive pulse the output voltage will be low, and fault indicating and inhibiting arrangements can come into action.

The invention is, of course, not limited to the embodiment described. Thus instead of the connecting relays KR1, RR1 etc., transistors or thyristors can be used and instead of polarized relays in the crossing points, for example memory cores, switch cores or other bistable elements can be used.

We claim:

1. Arrangement for indicating back currents exceeding a certain fixed value in diodes in a diode matrix having coordinate conductors which are interconnected electrically at crossing points by means of a load in the form of a bistable element having first and second terminals the first terminal of which upon selection is connected to a potential with a first polarity so as to be brought to a first condition, or to a potential with a second polarity so as to be brought to a second condition, the two polarities being applied through different diodes conducting each at respective first and second polarities, the arrangement including means for connecting the electrodes of the diodes, distance from the bistable element, each to the potential of the first or second polarity, the difference of which potential is directed in the blocked direction of the diodes, means for connecting to the second terminal of the bistable element a potential the value of which lies between said two potentials, so as to make a faulty diode pass a current, current sensing means each of which being responsive to one current operated when the diode blocking in its faultless condition in the respective current direction conducts in the backward direction, and said sensing means thereby generating an activating signal on its outlet, and indicating means operated by said activating signal upon the connection of said potential difference to the diodes and which when obtaining a signal from either of the current sensing means indicates that one of the diodes in the matrix is faulty.

2. Arrangement according to claim 1, said current sensing means comprising two transistor amplifiers each of said amplifiers including a transistor of the opposite type each base of which is connected through a diode to said second terminal of all bistable elements.